United States Patent [19]

Matesa

[11] 4,380,463
[45] Apr. 19, 1983

[54] METHOD OF MELTING GLASS MAKING INGREDIENTS

[75] Inventor: Joseph M. Matesa, Pittsburgh, Pa.

[73] Assignee: PPG Industries, Inc., Pittsburgh, Pa.

[21] Appl. No.: 308,302

[22] Filed: Oct. 5, 1981

[51] Int. Cl.³ .............................................. C03B 18/02
[52] U.S. Cl. ....................... 65/99.2; 65/134; 65/182.1
[58] Field of Search ...................... 65/99.2, 134, 182.1

[56] References Cited

U.S. PATENT DOCUMENTS

| | | |
|---|---|---|
| 708,309 | 9/1902 | Bronn . |
| 710,357 | 9/1902 | Heal ................................ 65/99.2 X |
| 2,371,213 | 3/1945 | Batchell . |
| 3,325,298 | 6/1967 | Brown, Jr. . |
| 3,361,550 | 1/1968 | Murphy et al. . |
| 3,450,516 | 6/1969 | Emhiser et al. . |
| 3,573,887 | 4/1971 | Mod et al. . |
| 3,896,201 | 7/1975 | Mabru . |
| 4,004,903 | 1/1977 | Daman et al. . |
| 4,023,976 | 5/1977 | Bauer et al. . |

FOREIGN PATENT DOCUMENTS 5193921 1/1976 Japan ..................................... 65/99.2

Primary Examiner—Robert L. Lindsay, Jr.
Attorney, Agent, or Firm—Dennis G. Millman; Donald C. Lepiane; Lee Patch

[57] ABSTRACT

A coherent thin sheet of glass batch materials is advanced onto a pool of molten metal contained in a glass melting furnace to melt thereon, preferably in non-contacting relation to refractory sidewalls of the furnace.

8 Claims, 2 Drawing Figures

METHOD OF MELTING GLASS MAKING INGREDIENTS

FIELD OF THE INVENTION

The invention relates to melting glassmaking ingredients, and more particularly, to advancing glass batch materials onto a pool of molten metal for melting thereon.

DISCUSSION OF THE TECHNICAL PROBLEM

U.S. Pat. No. 3,450,516 to Emhiser et al. discloses some difficulties and limitations, e.g., thermal inefficiencies, unduly large capacity requirements and glass inhomogeneities resulting from refractory contact, which exist in the conventional large scale glass melting process. To eliminate or diminish such difficulties, Emhiser teaches a method of melting glassmaking ingredients on a molten metal bath. In such a method, substantially loose particulate glassmaking ingredients are fed from a hopper by a pusher assembly onto the surface of a pool of molten tin, where they are melted while being advanced thereacross toward an outlet end. Emhiser discloses that thermal efficiencies are improved by eliminating the large reservoir of molten glass required in the conventional glass melting process, while the size of equipment required is substantially lessened.

Limitations which might be encountered in the method taught in Emhiser include:

1. Difficulty in controlling the flow of the loose particulate batch materials on the virtually drag-free surface of the molten metal bath. This could lead to substantial contact between batch materials and the refractory sidewalls of the melting chamber, giving rise to glass inhomogeneity problems. Additionally, different portions of the batch materials might flow downstream at different rates, producing non-uniformity in the time/temperature regime to which each portion is subjected;
2. "Dusting" difficulties, where fine loose batch materials are carried by atmospheric currents in the melting chamber from the batch layer into undesirable areas; and
3. The need for an unduly long refining area of the melting chamber, to remove gas bubbles existing in the molten glass due to gases originally contained in the loose batch material.

It would be desirable to have a method of melting glassmaking ingredients which would diminish or eliminate the above-mentioned difficulties.

SUMMARY OF THE INVENTION

The present invention provides a method of melting glassmaking ingredients in a glass melting chamber upon a pool of molten metal which (1) enhances flow control within the chamber to diminish glass inhomogeneities and nonuniformities in the time/temperature profiles to which batch materials are subjected, (2) diminishes "dusting" difficulties and (3) minimizes the refining requirements of the glass melting chamber. These results are accomplished by the steps of feeding a coherent thin sheet of glass batch materials progressively into the chamber onto the pool of molten metal; advancing the coherent thin sheet along the molten metal pool while maintaining the coherency of the sheet; melting the sheet into a corresponding layer of molten glass while it is being advanced across the molten metal pool; and, withdrawing the layer of molten glass from the chamber.

By feeding and advancing a coherent sheet of batch materials through the glass melting chamber, the flow of the sheet of batch materials and the resultant layer of molten glass is readily controlled to eliminate glass/refractory contact which may lead to glass inhomogeneity. Further, by controlling the flow of the sheet, substantially all of the batch material may be subjected to virtually identical time/temperature profiles while being advanced through the chamber, resulting in improved uniformity in the resulting glass.

Additionally, the present invention diminishes or eliminates problems, e.g., during, associated with loose batch. More particularly, by employing a sheet of batch materials which retains it coherency, the amount of loose particles in the melting chamber is diminished. Additionally, the sheet may be conveniently preheated with chamber exhaust gases before being fed into the chamber. Further, because a coherent sheet exhibits an increased density when compared to loose batch, there are entrapped less gases in the batch which require subsequent removal during the refining stages of the glassmelting process.

DESCRIPTION OF THE INVENTION

Figure 1:
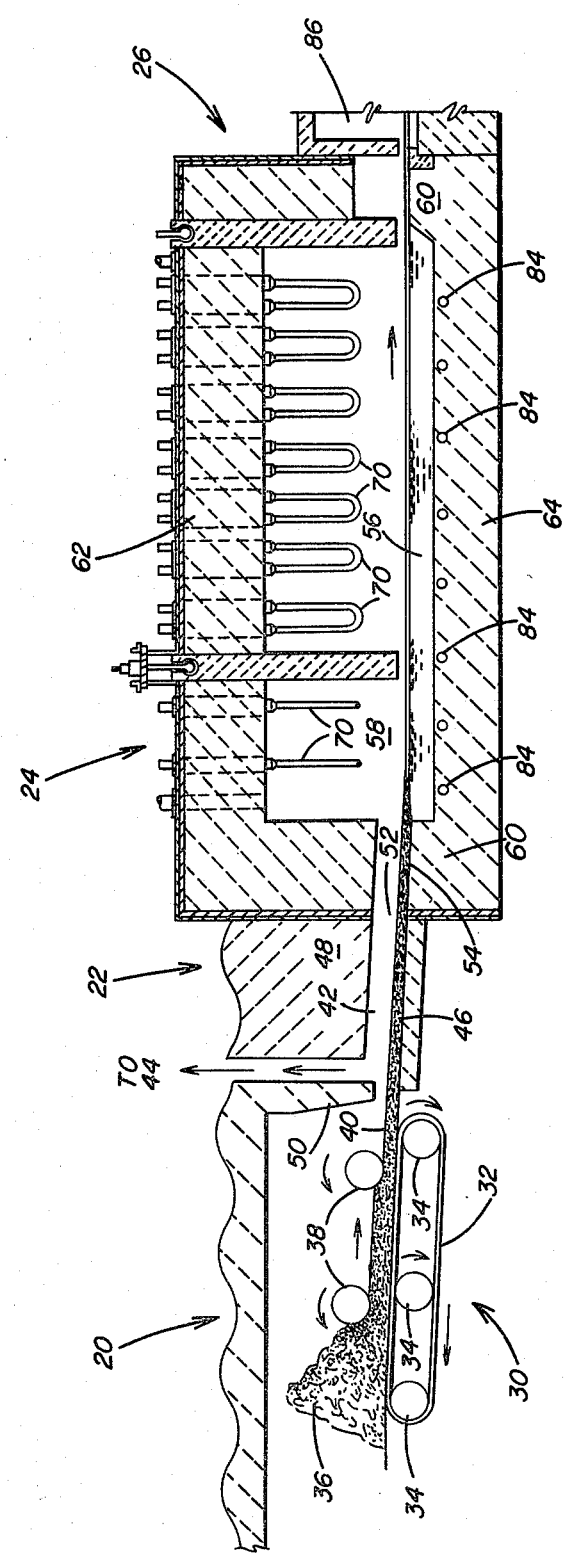
FIG. 1 is an elevated sectional view of a glass melting furnace in accordance with the teachings of the present invention, with portions removed for purposes of clarity.
Figure 2:
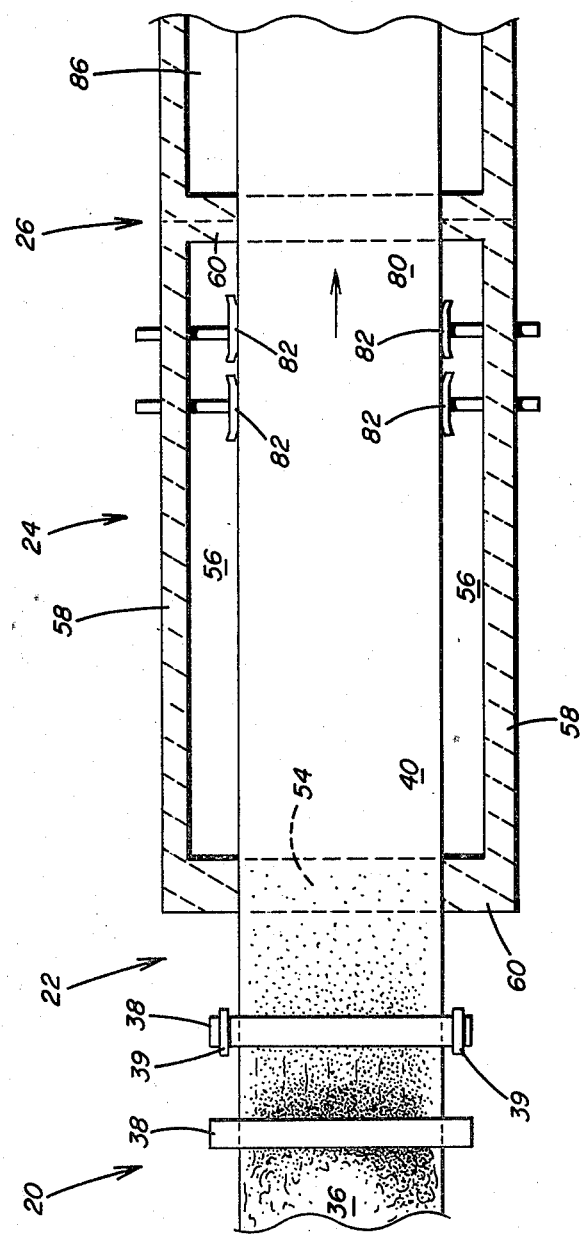
FIG. 2 is a plan view taken along line 2—2 of FIG. 1, illustrating glass melting furnace, with portions removed for purposes of clarity.

With reference to FIGS. 1 and 2, there are shown facilities incorporating features of the invention for melting glassmaking ingredients (or batch materials) into a layer of molten glass, which may subsequently be formed in any convenient manner, e.g., into a flat ribbon of glass. Generally included in such facilities is a batch sheet forming region 20, a sheet input region 22, a glass melting furnace 24, and a sheet withdrawal region 26.

In the practice of the present invention, there is formed a coherent thin sheet of batch materials which is preferably continuously fed into the glass melting furnace 24. A coherent sheet, as used herein, is defined to include a sheet having portions secured together to resist separation and which remain in substantially similar orientation one to another during advancement through the glassmelting furnace 24. Accordingly, although not limiting to the invention, the batch sheet forming region 20 may include a batch conveyor system 30 formed of an endless belt 32 driven about a plurality of drive rolls 34. An accumulation of batch materials in the form of batch pile 36 is conveniently provided on one end of the belt 32, and a portion thereof is continuously conveyed by belt 32 under a plurality of overlying compression rolls 38. As the belt 32 moves the particulate batch material under compression rolls 38, the batch material is conveniently press-formed into a coherent thin sheet 40 of the desired thickness and width. Compression of the particulate batch materials during sheet formation provides a sheet 40 having a density greater than the original loose particulate batch material, and thus, a correspondingly lesser amount of entrapped air between its constituent parts.

Although not limiting to the invention, it is preferred to add a selected amount of a convenient binder material to the conventional glass batch materials to promote the formation of the coherent thin sheet 40. Acceptable binder materials are preferably aqueous solutions of inorganic compositions, e.g., sodium silicate ($Na_2O \cdot SiO_2$), caustic soda, etc., which may be added to the conventional glass materials without altering its basic chemical composition. Binder materials which include organic components may also be utilized in the practice of the invention, particularly where measures are taken to minimize the reducing effect of the organic components on the final glass product.

In a preferred embodiment of practicing the invention, a 7% by weight sodium metasilicate solution is added to particulate batch materials including sand, limestone, dolomite, and soda ash. Preferably the limestone utilized in formation of the sheet 40 is relatively finely pulverized. For example, whereas a conventional batch composition might utilize limestone sized such that 92% thereof is larger than +120 Mesh particles, the limestone preferably uttilized in the practice of the present invention has only between about 50% to about 85% thereof larger than +120 Mesh particles, with about 50% being most preferred. The sand utilized may be a high silica glass sand sized at about −30 Mesh or finer. The dolomite utilized may be conventionally sized at about 92% larger than +120 Mesh particles, and the soda ash is conventionally sized in finely pulverized form. Sheets 40 having a thickness between about 0.10 inch (0.25 cm.) and about 1 inch (2.5 cm.) may be formed in this manner which satisfactorily remain coherent during subsequent feeding into the glass-melting furnace 24 and melting therein.

With continued reference to the Figures, the coherent thin sheet 40 is advanced from the conveyer belt 32 into and through the sheet input region 22. The input region 22 may include a tunnel 42 through which exhaust gases from the glass melting furnace 24 pass in route toward an exhaust stack 44. The tunnel 42 is defined by a lower sheet supporting member 46, a roof member 48, and a backwall 50, which serves to direct exhaust gases upwardly toward the exhaust stack. In this manner, the coherent thin sheet 40 is subjected to preheating conditions before entering the melting furnace, which serves both to improve overall energy efficiency and to increase the structural integrity of the sheet 40 by removing excess moisture therefrom.

The sheet 40 advances due to the driving force of the belt 32 and due to gravity from the tunnel region 42 into the glass melting furnace 24 through an inlet opening 52 onto a pool of molten metal 56 contained therein. In one preferred embodiment of the invention, the conveyor belt 32, sheet supporting surface 42, and the sheet supporting portion 54 of the inlet opening 52 are aligned to form a gradual inclined plane upon which the sheet 40 may smoothly advance while retaining its coherency. The supporting surface 42 and supporting portion 54 may be formed of a material such as stainless steel or graphite to promote the smooth advancement of the sheet 40. With reference to FIGS. 1 and 2 as required, the furnace 24 is generally formed of refractory sidewalls 58, refractory endwalls 60, and a refractory roof 62 and bottomwall 64. The pool of molten metal 56 supports and heats the coherent thin sheet 40 from its underside. Preferably, the temperature regime in the furnace 24 is maintained between about 2600° F.–2900° F. (1425° C.–1595° C.) both above and below the sheet/molten glass layer. Overhead heating may be provided by electrical facilities, e.g., heaters 70 in FIG. 1, or alternatively, by fossil fuel firing. Underlying heating facilities 84 serve to maintain the metal in a molten condition and to input heat to the underside of the sheet/molten glass layer.

The metal utilized in the molten metal pool 56 is preferably primarily copper with traces of iron therein in accordance with the work of K. H. Bloss and R. Stewart, the subject matter of a co-pending U.S. patent application Ser. No. 344,460, filed Feb. 1, 1982. Alternatively the metal may be of the type including tin, gold or silver, as taught in U.S. Pat. No. 3,450,516, which is hereby incorporated by reference.

As shown in FIG. 2, the coherent thin sheet 40 preferably has a width less than the width of the molten metal pool 56, and advances therealong in the central portion to space the marginal edges of the sheet 40 from the refractory sidewalls 58. As the sheet 40 advances downstream along the molten metal pool 56 it is conveniently heated from above and below and melts to form a continuous layer of molten glass 80 supported on the molten metal pool 56.

The layer of molten glass 80 will adopt an equilibrium thickness of about one fourth inch (0.6 cm.) upon the molten metal pool 56 due to opposing gravitational and surface tensional forces. To maintain the layer of molten glass 80 in the preferred non-contacting relation to the refractory sidewalls 58, the thickness and width of the coherent thin sheet 40 may be selected within desired ranges. For example, in a simple embodiment of the invention, the thickness of the sheet 40 is selected at a value, e.g., about ¼ inch (0.6 cm.), which melts to a glass thickness equal to the equilibrium thickness of molten glass on the molten metal pool 56. In such an embodiment, the width of the sheet 40/molten glass layer 80 will remain substantially constant throughout the length of the chamber 24, and glass/sidewall contact may be conveniently avoided by selecting a width for the sheet 40 which is less than the width of the molten metal pool 56.

In a second embodiment of the invention, the coherent thin sheet 40 may be formed with a thickness less than the equilibrium thickness of molten glass on the molten metal pool 56, in which case the layer of molten glass 80 will decrease in width as it moves toward equilibrium thickness. Thus, the layer of molten glass 80 will be withdrawn from the furnace 24 with a width less than that of the incoming sheet 40, and the avoidance of sidewall contact is conveniently assured during passage through the furnace 24 by selecting a width for the sheet 40 which is less than the width of the molten metal pool 56.

Alternatively, the invention may be practiced with a thin sheet 40 having a thickness which, when melted, would provide molten glass having a thickness greater than the equilibrium thickness of the molten glass on the molten metal pool 56. In such case, the layer of molten glass 80 will flow to its equilibrium thickness within the furnace 24 and thereby adopt a width greater than the width of the sheet 40. Glass/sidewall contact may be avoided in such an embodiment by utilizing (1) a sufficiently wide, constant width furnace 24; (2) a furnace having increasing width in the downstream direction; or (3) side-restraining members 82 (shown in FIG. 2). Side-restraining members 82 are preferably formed of a material which minimizes drag forces along the marginal edges of the layer of molten glass 80, and additionally resists dissolution into the molten glass. A preferred material for such purposes is graphite. Side-restraining members 82 may also be utilized in other embodiments of the invention to steer the sheet 40 and molten glass layer 80 during advancement. Additional steering capabilities may be provided to the system through upraised retaining members 39 which may be adjustably positioned on the compression rolls 38.

As can now be appreciated by one skilled in the art, numerous advantages may be realized by practicing the present invention. First, by utilizing a coherent sheet of batch materials, control over the position of the batch-/molten glass layer may be maintained at both the input and exit ends of the melting chamber to avoid contact with the refractory sidewalls. Thus, inhomogeneities due to the dissolution of portions of the refractory sidewalls into the molten glass may be completely eliminated. This result may not be achievable where loose batch material is fed onto the virtually drag-free pool of molten metal 56, for such loose batch material will tend to freely spread to the refractory sidewalls 58, melt therealong, and dissolve portions thereof.

Secondly, by utilizing a coherent sheet 40 of batch material, the temperature conditions to which each portion of the sheet 40 are subjected may be normalized, thereby improving the uniformity of melting of the batch material. Utilization of loose batch materials tends to result in non-uniformity of residence time within the melting furnace, with corresponding non-uniformity of melting.

Additionally, use of a thin, densified sheet 40 of batch materials promotes rapid melting, unlike a loose batch blanket which tends to insulate its portions not directly subjected to heat.

Further, use of a coherent sheet 40 permits preheating for thermal efficiency, and minimizes dusting problems commonly associated with loose batch materials or small agglomerations of batch materials, e.g., pellets or briquets.

Still further, formation of a compressed sheet 40 minimizes the amount of entrapped air in the batch material and reduces the refining requirements of the glass melting furnace 24. In this regard, and with reference to the Figures, the length of the pool of molten metal 56 is preferably sufficient for the sheet 40 to liquefy into a layer of molten glass and thereafter for gas inclusions in the molten glass to rise to the surface thereof, i.e., sufficient for both melting and refining to occur. By utilizing a densified sheet of batch materials in the practice of the present invention, less open area exists between batch particles and therefore less air is entrapped in the batch materials. As a result, refining may be accomplished with a molten metal pool 56 of a shorter length than heretofore possible. Of course, proper selection of the length of the molten metal pool 56 will be dependent upon the temperature regime within the furnace 24, as well as the dimensions and rate of advancement of the sheet 40.

With reference to the Figures, the layer of molten glass 80 into which the sheet 40 is transformed during its advancement along the molten metal pool 56 is withdrawn at the sheet withdrawal region 26, and may subsequently be advanced into a forming chamber, e.g., float chamber 86.

Of course, the scope of the present invention is not intended to be limited by the specific illustrative embodiments discussed herein, but rather by the claims which follow.

I claim:

1. A method of melting glassmaking ingredients in a glass melting chamber, said glass melting chamber including refractory sidewalls and endwalls forming a container for containing a pool of molten metal therein, comprising the steps of:
   feeding a coherent thin sheet of glass batch materials having a width less than the width of said molten metal pool progressively into said glass melting chamber onto the surface of said pool of molten metal;
   advancing said coherent thin sheet along said pool of molten metal while maintaining the coherency thereof, and while maintaining the coherent thin sheet in non-contacting relation to the refractory sidewalls;
   melting said coherent thin sheet into a layer of molten glass while practicing said advancing step; and
   withdrawing said layer of molten glass from said glass melting chamber.

2. The method as set forth in claim 1 further comprising the step of maintaining said molten glass layer in non-contacting relation to said refractory sidewalls while practicing said advancing step.

3. The method as set forth in claim 1 or 2 further comprising the steps of:
   forming said coherent thin sheet from a mixture of glass making ingredients and a sodium silicate solution; and
   preheating said coherent thin sheet with chamber exhaust products prior to practicing said feeding step.

4. The method as set forth in claim 3 wherein said feeding step comprises the step of:
   conveying said coherent thin sheet downwardly along an inclined surface onto said pool of molten metal.

5. The method as set forth in claim 2 wherein said coherent thin sheet has a thickness which when melted is substantially equal to the equilibrium thickness of molten glass on said molten metal pool.

6. The method as set forth in claim 1 wherein said molten metal pool comprises copper.

7. The method as set forth in claim 6 wherein said molten metal pool further comprises minor percentages of iron.

8. The method as set forth in claim 1 wherein said thin sheet of glass batch materials is between 0.1 inch (0.25 cm.) and 1.0 inch (2.5 cm.).

* * * * *